(12) United States Patent
Wodausch et al.

(10) Patent No.: US 10,934,908 B2
(45) Date of Patent: Mar. 2, 2021

(54) METHOD FOR REGENERATING A PARTICLE FILTER, AND MOTOR VEHICLE HAVING A PARTICLE FILTER

(71) Applicant: VOLKSWAGEN AKTIENGESELLSCHAFT, Wolfsburg (DE)

(72) Inventors: Jens Wodausch, Braunschweig (DE); Florian Zink, Bad Rappenau (DE); Jan Knaup, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 13 days.

(21) Appl. No.: 16/340,367

(22) PCT Filed: Oct. 9, 2017

(86) PCT No.: PCT/EP2017/075694
§ 371 (c)(1),
(2) Date: Apr. 8, 2019

(87) PCT Pub. No.: WO2018/069254
PCT Pub. Date: Apr. 19, 2018

(65) Prior Publication Data
US 2019/0249581 A1 Aug. 15, 2019

(30) Foreign Application Priority Data

Oct. 10, 2016 (DE) .......................... 102016119212.0

(51) Int. Cl.
*F01N 3/023* (2006.01)
*B60K 15/035* (2006.01)
(Continued)

(52) U.S. Cl.
CPC ............ *F01N 3/023* (2013.01); *B60K 15/035* (2013.01); *B60K 15/03504* (2013.01);
(Continued)

(58) Field of Classification Search
CPC combination set(s) only.
See application file for complete search history.

(56) References Cited

U.S. PATENT DOCUMENTS 4,522,028 A * 6/1985 Hasegawa ............. F01N 3/0256
55/283
8,650,861 B2 * 2/2014 Arrigoni ................. F01N 9/007
60/295
(Continued)

FOREIGN PATENT DOCUMENTS

DE          41 34 199 C2    6/2000
DE          100 05 909 A1   8/2001
(Continued)

OTHER PUBLICATIONS

Search report for German Patent Application No. 10 2016 119 212.0, dated Jun. 20, 2017.
(Continued)

*Primary Examiner* — Binh Q Tran
(74) *Attorney, Agent, or Firm* — Pearl Cohen Zedek Latzer Baratz LLP (57) ABSTRACT

The invention relates to a method for regenerating a particle filter (74) in an exhaust system (60) of a motor vehicle (10) having an internal combustion engine (12). Here, for a temperature increase to a temperature (T) required for the regeneration of the particle filter (74), a sorption agent container (102) of a fuel tank (22) of the motor vehicle (10) is purged, and the fuel vapours (24) retained in the sorption agent container (102), in particular an activated carbon filter, are supplied directly or indirectly to the exhaust system (60)

(Continued)

upstream of the particle filter (74). By means of an exothermic conversion of the fuel vapours (24) in the exhaust system (60) upstream of the particle filter (74), the exhaust-gas temperature (T) can be increased without the need for engine-internal measures for increasing the exhaust-gas temperature.

15 Claims, 3 Drawing Sheets

(51) Int. Cl.
  *F01N 3/36* (2006.01)
  *F01N 9/00* (2006.01)
  *F02M 25/08* (2006.01)
  *F01N 3/035* (2006.01)
  *F01N 3/021* (2006.01)

(52) U.S. Cl.
  CPC .............. *F01N 3/021* (2013.01); *F01N 3/035* (2013.01); *F01N 3/36* (2013.01); *F01N 9/002* (2013.01); *F02M 25/08* (2013.01); *F01N 2260/04* (2013.01); *F01N 2610/03* (2013.01); *F01N 2610/06* (2013.01); *Y02A 50/20* (2018.01); *Y02T 10/12* (2013.01); *Y02T 10/40* (2013.01)

(56) References Cited

U.S. PATENT DOCUMENTS

| | | | |
|---|---|---|---|
| 8,683,786 B2* | 4/2014 | Ruona | F01N 9/00 60/295 |
| 9,687,782 B1* | 6/2017 | Miao | F01N 3/021 |
| 10,309,284 B2* | 6/2019 | Crawley | F01N 3/36 |
| 2004/0261403 A1 | 12/2004 | Asmus et al. | |
| 2011/0047995 A1* | 3/2011 | Lewis | B01D 53/9418 60/302 |
| 2015/0345414 A1 | 12/2015 | Klotz et al. | |
| 2018/0066595 A1* | 3/2018 | Dudar | F02D 41/0037 |

FOREIGN PATENT DOCUMENTS

| | | |
|---|---|---|
| DE | 101 30 633 A1 | 1/2003 |
| DE | 10 2004 016 538 A1 | 11/2005 |
| DE | 11 2008 002 466 T5 | 9/2010 |
| DE | 10 2013 202 433 A1 | 8/2014 |
| DE | 10 2013 220 899 A1 | 4/2015 |

OTHER PUBLICATIONS

International Search Report of PCT Application No. PCT/EP2017/075694, dated Nov. 23, 2017.

\* cited by examiner

METHOD FOR REGENERATING A PARTICLE FILTER, AND MOTOR VEHICLE HAVING A PARTICLE FILTER

CROSS-REFERENCE TO RELATED APPLICATIONS

This application is a National Phase Application of PCT International Application No. PCT/EP2017/075694, International Filing Date Oct. 9, 2017, claiming priority of German Patent Application No. 10 2016 119 212.0, filed Oct. 10, 2016, which is hereby incorporated by reference.

FIELD OF THE INVENTION

The invention relates to a method for regenerating a particle filter in the exhaust duct of a motor vehicle, and a motor vehicle having a particle filter situated in the exhaust duct.

BACKGROUND OF THE INVENTION

The increasing stringency of exhaust emission regulations has placed high demands on automotive manufacturers, which are addressed by suitable measures to reduce uncontrolled engine emissions and appropriate exhaust aftertreatment. The EU6 legislation prescribes a particle count limit for gasoline engines, which in many cases requires use of a gasoline engine particle filter. During driving operation, such a gasoline engine particle filter becomes loaded with soot. This gasoline engine particle filter must be continuously or periodically regenerated to prevent excessive exhaust back pressure. Carrying out thermal oxidation of the soot, retained in the gasoline engine particle filter, with oxygen requires a sufficiently high temperature level together with the simultaneous presence of oxygen in the exhaust gas system of the gasoline engine. Since current gasoline engines are normally operated with a stoichiometric combustion air ratio ($\lambda=1$) without excess oxygen, additional measures are necessary. Examples of such measures include increasing the temperature by adjusting the ignition angle, temporarily adjusting the gasoline engine to lean conditions, blowing secondary air into the exhaust gas system, or a combination of these measures. Thus far, adjustment of the ignition angle in the retarded direction in combination with an adjustment of the gasoline engine to lean has been preferred, since this method does not require additional components, and is able to deliver a sufficient quantity of oxygen in most operating points of the gasoline engine.

The fuel for operating the internal combustion engine is stored in a fuel tank of the motor vehicle. Evaporation of the fuel, in particular so-called volatile low-molecular hydrocarbons, occurs as a function of the ambient temperature, the temperature of the fuel in the tank, the free liquid surface, and other influencing factors. The fuel vapors are typically collected in an activated carbon filter of the tank system situated in a filling line of the fuel tank. Since the absorption capacity of activated carbon filters is limited, this activated carbon filter must be regenerated from time to time, and the hydrocarbons retained therein must be purged. These hydrocarbons must not escape to the environment as uncontrolled pollutant emissions. For this purpose, the activated carbon filter is purged with an air stream that is supplied to the internal combustion engine in order to react the hydrocarbons, purged from the activated carbon filter, in the combustion chambers of the internal combustion engine.

A method is known from DE 41 34 199 C2 in which, as a function of an operating state of the internal combustion engine, the purge air stream containing the hydrocarbons purged from the activated carbon filter is selectively supplied to the combustion air of the internal combustion engine or to the exhaust gas system, in particular a secondary air line of the exhaust gas system, of the motor vehicle in order to exothermically react the hydrocarbons on the three-way catalytic converter.

A method for regenerating a particle filter in the exhaust duct of an internal combustion engine, in particular a gasoline engine, is known from DE 10 2013 220 899 A1, for example. Lambda control for the gasoline engine is provided, wherein the combustion air ratio for regenerating the particle filter is adjusted, starting from a stoichiometric combustion air ratio and going toward an overstoichiometric combustion air ratio, and the excess oxygen is used to achieve regeneration of the particle filter by oxidizing the soot.

In addition, a method for regenerating a particle filter is known from DE 101 30 633 A1, comprising a temperature management system for increasing the temperature for regenerating the particle filter and for avoiding cooling of the particle filter, wherein $NO_x$ is oxidized to $NO_2$ on an oxidation catalytic converter, and the $NO_2$ that forms is used to react the soot particles deposited in the particle filter to form carbon dioxide $CO_2$ and molecular nitrogen $N_2$.

A disadvantage of the known heating measures, however, is that in the known methods, engine-internal measures for heating the particle filter to a regeneration temperature and the related engine-internal measures result in increased fuel consumption and/or loss of comfort during the driving operation of the motor vehicle.

SUMMARY OF THE INVENTION

The object of the invention is to achieve the temperature necessary for regenerating the particle filter without having to carry out engine-internal measures.

The object is achieved by a method for regenerating a particle filter in the exhaust duct of a motor vehicle, wherein the motor vehicle has: an internal combustion engine that is operable with a fuel, an exhaust duct in which at least one particle filter is situated, a fuel tank, a sorption agent container that is in fluid-conducting connection with the fuel tank and contains a sorption agent, and a purge line that connects the sorption agent container to the internal combustion engine or to the exhaust duct upstream from the particle filter, and wherein for heating the particle filter, the fuel retained in the sorption agent container is supplied to the purge agent line. By use of a method according to the invention, the hydrocarbons retained in the sorption agent container may be utilized by an exothermic reaction in the exhaust duct to increase a temperature of the particle filter without the need for adjusting the engine-internal parameters of the internal combustion engine. Regeneration of the particle filter may thus be carried out without increased fuel consumption, and driving comfort is maintained due to the fact that it is not adversely affected by intermittent adjustment of the injection parameters of the internal combustion engine.

Advantageous improvements and refinements of the method for regenerating a particle filter stated in the independent claim are possible due to the measures set forth in the dependent claims.

In one preferred embodiment of the method, it is provided that purging of the sorption agent container and the associated supplying of the fuel retained in the sorption agent container to the exhaust duct of the internal combustion engine take place in an overrun phase of the internal combustion engine. In an overrun phase of the internal combustion engine, a throttle valve of the internal combustion engine is essentially open, so that a comparatively large mass and volume flow of fresh air passes through the internal combustion engine, and high purge quantities may thus be provided through the sorption agent container and the sorption agent situated therein. In overrun mode, the providable purge quantity is essentially independent of the driving behavior, since in the unfired overrun mode, the air conveyed through the internal combustion engine is not mixed with fuel supplied via the fuel line and the fuel injection system and combusted. Therefore, the exhaust gas in overrun mode always contains a high oxygen fraction, which may be utilized for oxidizing the fuel vapor discharged from the sorption agent container. In addition, this high oxygen fraction may be utilized for oxidizing the soot particles retained in the particle filter, and thus, regenerating the particle filter. Furthermore, very few or no structural measures are necessary in the existing system in order to implement the method. Rather, an appropriately configured control device is sufficient to carry out the method. In contrast, the opening of tank vent valves in overrun mode is prevented in systems known from the prior art.

In one advantageous refinement of the invention, it is provided that engine-internal measures are additionally initiated for increasing the exhaust gas temperature. One example of an engine-internal measure is lambda split operation, i.e., operation of half of the combustion chambers with an overstoichiometric combustion air ratio, and operation of a second half of the combustion chambers with an understoichiometric combustion air ratio, wherein the uncombusted fuel from the understoichiometrically operated combustion chambers is reacted with the residual oxygen from the overstoichiometrically operated combustion chambers in the exhaust duct, thus providing a temperature increase. Alternatively, adjusting the ignition angle in the retarded direction is known for increasing the temperature of the exhaust gas. By combining engine-internal measures and introducing the hydrocarbons from the sorption agent container, regeneration of the particle filter may be made possible, also in operating phases in which regeneration solely using engine-internal measures would not be possible.

According to one advantageous improvement of the invention, it is provided that a loading state of the particle filter is determined, and a purging operation of the sorption agent container is carried out when the need for regenerating the particle filter is established. The loading state of the particle filter may be determined, for example, by a differential pressure measurement across the particle filter or by use of a loading model. The sorption agent container may be periodically regenerated during the regeneration cycles of the particle filter, and thus, regularly purged.

It is particularly preferred when an exhaust gas temperature in the exhaust duct, preferably directly upstream from the particle filter, is determined, and a purging operation of the sorption agent container takes place when the exhaust gas temperature is below a first threshold temperature. Purging of the hydrocarbons retained in the sorption agent or in the sorption agent container is advantageous in particular when the temperature of the exhaust gas in the exhaust duct is below a regeneration temperature of the particle filter, in particular below 600° C. A purging operation of the sorption agent container may and should be prevented when the exhaust gas temperature is above this first threshold temperature in order to avoid thermal damage to the particle filter due to further heating.

According to a further improvement of the method, it is provided that a purging operation of the sorption agent container takes place only when the exhaust gas temperature is above a second threshold temperature, in particular above a light-off temperature of the three-way catalytic converter. Exhaust gas catalytic converters require a certain minimum temperature, also referred to as the light-off temperature, in order to have sufficient catalytic activity. The light-off temperature is defined as the temperature at which the catalytic converter has 50% of its maximum conversion rate. If the exhaust gas temperature, and in particular the temperature of a catalytic converter that oxidizes hydrocarbons, is below a second threshold temperature, hydrocarbons that are introduced into the exhaust duct are not sufficiently reacted, as the result of which an adequate exothermic reaction for heating the particle filter does not take place. At very low exhaust gas temperatures, hydrocarbons that are introduced into the exhaust duct may even result in cooling of the exhaust gas, so that the inventive purpose of the method is not achieved. It is therefore meaningful to carry out a purging operation of the sorption agent container only when the exhaust gas temperature is above a second threshold temperature.

In one preferred embodiment of the method, it is provided that an air stream used for purging the sorption agent container is generated by means of a pumping or suction action of the internal combustion engine. In overrun mode, in which the kinetic energy or instantaneous power of the vehicle is greater than the power requested by the driver, the vehicle is moved by the overrun and the internal combustion engine is "dragged"; i.e., no fuel is injected into the combustion chambers of the internal combustion engine by the fuel injection system. As the result of utilizing the dragged engine as a pump, an additional conveying means for conveying air through the sorption agent container is not necessary.

For a further improvement of the method, it is provided that a volume flow of fuel supplied to the exhaust duct by a purging operation of the sorption agent container is controlled or regulated by setting a mass or volume flow of the air conveyed through the sorption agent container. The mass or volume flow is preferably controlled or regulated in such a way that excess oxygen ($\lambda > 1$) is present in the exhaust duct during an overrun phase. In this way, essentially complete reaction of the fuel introduced via the purging operation may be ensured in an overrun mode, so that the purging operation does not result in an undesirable increase in emissions of uncombusted hydrocarbons.

A further improvement of the proposed method is possible in that a mass or volume flow conveyed through the sorption agent container is set by an opening time and/or an opening cross section of an actuating means, in particular a tank vent valve, situated in the purge line. The fraction of hydrocarbons in the exhaust gas may be easily adjusted by setting a predetermined opening time and/or a predetermined opening cross section of the actuating means. The tank vent valve is particularly suited as an actuating means due to the fact that it is in the immediate vicinity of the sorption agent container, and a particularly simple interaction between the sorption agent container and the tank vent valve is thus possible.

According to the invention, a motor vehicle having an internal combustion engine that is operable with fuel, an exhaust gas system in which a particle filter is situated, a fuel tank, a sorption agent container that is in fluid-conducting connection with the fuel tank and contains a sorption agent, a purge line that connects the sorption agent container to the internal combustion engine and/or to the exhaust gas system upstream from the particle filter, and a control unit, in particular a control device, that is configured for carrying out the proposed method, is provided.

In one preferred embodiment of the motor vehicle, it is provided that a three-way catalytic converter is situated in the exhaust gas system, downstream from an outlet of the internal combustion engine and upstream from the particle filter. On the surface of the three-way catalytic converter, the uncombusted hydrocarbons supplied to the exhaust duct from the sorption agent container may be easily exothermically reacted with the residual oxygen in the exhaust duct, resulting in an increased exhaust gas temperature before entering the particle filter. The conversion rates are hereby much higher than in other areas of the exhaust duct.

Alternatively, in another embodiment of the invention it is provided that a four-way catalytic converter having a particle filter with a three-way catalytically active coating is provided in the exhaust gas system. Alternatively, a reaction of the uncombusted hydrocarbons from the sorption agent container may take place on the surface of a four-way catalytic converter. A four-way catalytic converter includes the functionality of a three-way catalytic converter and a particle filter, wherein a three-way catalytically active coating is preferably applied to the surface of a particle filter. An exothermic reaction of the uncombusted hydrocarbons on the three-way catalytically active coating results in direct heating of the particle filter, so that particularly effective utilization of the energy of the hydrocarbons takes place due to the fact that no additional waste heat is lost via the walls of the exhaust duct.

In one advantageous improvement of the motor vehicle, it is provided that the purge line opens into an exhaust duct of the exhaust gas system downstream from an outlet and upstream from the three-way catalytic converter or the four-way catalytic converter. Due to the purge line opening downstream from the outlet of the internal combustion engine, it is ensured that the hydrocarbons do not deposit on cold combustion chamber walls and condense there, which could result in increased hydrocarbon emissions. In addition, the existing lambda control of the three-way catalytic converter or four-way catalytic converter may be utilized to adjust a volume or mass flow of uncombusted hydrocarbons from the sorption agent container, and to supply only the amount of hydrocarbons to the exhaust duct that results in essentially complete reaction on the surface of the catalytic converter. An increase in the hydrocarbon emissions, in particular in overrun mode, is thus avoided.

For further improvement of the motor vehicle, it is provided that the sorption agent container is fluidically connected to a suction jet pump. By use of a suction jet pump it is possible to convey the fuel retained in the sorption agent container without having to supply additional energy to the system for purging the sorption agent container. The increased fuel consumption during use of a suction jet pump may be avoided, even if this increased fuel consumption for a driven purge pump is extremely low. In addition, the suction jet pump is independent of an external power supply, thus reducing the risk of an outage.

In a further improvement of the motor vehicle, it is provided that a purge blower for purging the sorption agent container is situated at the sorption agent container. Alternatively, the sorption agent container may be emptied by a purge blower. A purge blower has the advantage that purging of the sorption agent container may take place essentially independently of an operating state of the internal combustion engine, and thus also independently of a regeneration of the particle filter. This is advantageous when, for example, purging of the sorption agent container between two intervals is necessary for regenerating the particle filter.

The various embodiments of the invention mentioned in the present patent application, unless stated otherwise in the individual case, may advantageously be combined with one another.

BRIEF DESCRIPTION OF THE DRAWINGS

The invention is explained below in exemplary embodiments, with reference to the associated drawings. Identical components or components having an identical function are denoted by the same reference symbols in the various figures, which show the following.

DETAILED DESCRIPTION OF THE INVENTION

Figure 1:
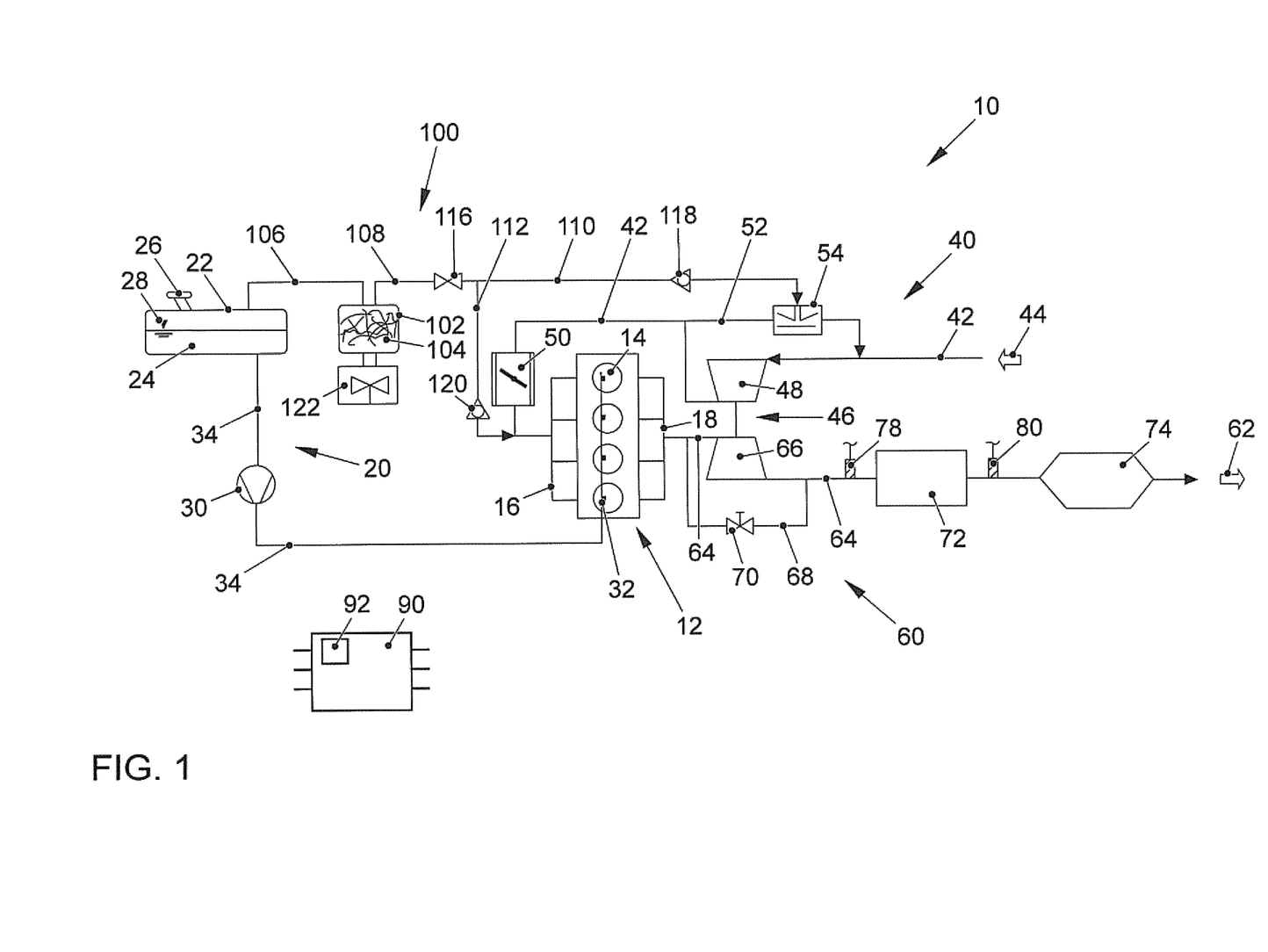
FIG. 1 shows a first exemplary embodiment of a block diagram of a motor vehicle according to the invention.

FIG. 1 shows a block diagram of a motor vehicle 10 according to the invention. The motor vehicle includes an internal combustion engine 12, a fuel supply system 20, an air supply system 40, an exhaust gas system 60, and a fuel vapor sorption system 100.

The internal combustion engine 12 includes at least one combustion chamber, in the present case four, for example, combustion chambers 14, and is preferably a (spark-ignition) gasoline engine, but may also be an (auto-ignition) diesel engine. In the following example, the internal combustion engine 12 is designed as a gasoline engine that is spark-ignited by means of spark plugs. The internal combustion engine 12 is operable with a fuel 24 that is stored in a fuel tank 22 of the motor vehicle 10. The fuel tank 22 may be filled through a filling neck 26, and is equipped with a filling level sensor 28 for detecting the filling level. The fuel 24 is supplied by means of a fuel pump 30 to the internal combustion engine 12 via a fuel line 34 that branches off from the fuel tank 22; in the internal combustion engine the fuel is injected into the combustion chambers 14 of the internal combustion engine 12 by means of a fuel injection system 32.

Fresh air 44 that is drawn in from the surroundings and provided to an inlet 16 that distributes the fresh air 44 over the combustion chambers 14 of the internal combustion engine 12 via an intake line 42 is supplied to the internal combustion engine 12 via the air supply system 40. In the illustrated example, the fresh air 44 is compressed by a compressor 48 of an exhaust gas turbocharger 46 to be able to operate the internal combustion engine 12 at a higher charge pressure than ambient pressure, and thus to operate with increased power. The compressor 48 is driven by a turbine 66 that is situated in the exhaust gas system 60 and is connected to the compressor 48 via a shaft. An adjustable throttle valve 50 by means of which the filling of the combustion chambers 14 may be controlled or regulated is situated in the intake line 42, downstream from the compressor 48. The air supply system 40 also has a return flow line 52 that branches off from the intake line 42 downstream from the compressor 48 and opens into the intake line 42 upstream from the compressor 48. A suction jet pump 54, whose function is explained in greater detail below in the description of the fuel vapor sorption system 100, is situated in the return flow line 52.

Exhaust gas 62 of the internal combustion engine 12 is supplied via an outlet 18, in particular an exhaust manifold, to the exhaust gas system 60, where it undergoes catalytic aftertreatment. For this purpose, the exhaust gas system 60 includes an exhaust duct 64 in which the above-mentioned turbine 66 of the exhaust gas turbocharger 46 is situated, so that the exhaust gas 62 drives the turbine 66, and thus the compressor 48, with withdrawal of kinetic energy. The turbine 66 may be bypassed by means of a wastegate 68, the exhaust gas fraction that is led through the wastegate 68 being adjustable by a wastegate valve 70, in particular an electrically actuatable valve. To convert limited harmful exhaust gas components into harmless exhaust gas components, the exhaust gas system 60 has a catalytic converter 72, in particular a three-way catalytic converter. Exhaust gas catalytic converters are typically made up of a catalyst support that is provided with a catalytically active coating and through which the exhaust gas 62 may flow. The chemical composition of the catalytic coating determines which exhaust gas components are catalytically reacted. Oxidation catalytic converters catalyze the conversion of uncombusted hydrocarbons HC and carbon monoxide CO, reduction catalytic converters assist with the conversion of nitrogen oxides $NO_x$, and three-way catalytic converters combine the functions of oxidation catalytic converters and reduction catalytic converters. In the present case, the illustrated catalytic converter 72 is a three-way catalytic converter. Situated downstream from the catalytic converter 72 is a particle filter 74 which retains the particles that occur during combustion of the fuel 24 in the combustion chambers 14 of the internal combustion engine 12 and prevents them from being emitted. In addition, the exhaust gas system 60 may have further components for exhaust aftertreatment, in particular a $NO_x$ storage catalytic converter or a catalytic converter for the selective catalytic reduction of nitrogen oxides. Situated in the exhaust duct 64, upstream from the catalytic converter 72, is a first lambda sensor 78 that measures an air-fuel ratio (referred to below as the air ratio), more precisely, the fraction of oxygen in the uncontrolled exhaust gas 62. The first lambda sensor 78 is used primarily for controlling the air-fuel mixture or the fuel fraction therein that is supplied to the internal combustion engine 12. Situated in the exhaust duct 64, downstream from the exhaust gas catalytic converter 72, is a second lambda sensor 80 that measures the air-fuel ratio (referred to below as the air ratio) or the fraction of oxygen in the exhaust gas 62 after passing through the catalytic converter 72. The function of the second lambda sensor 80, among other things, is to monitor the functioning of the catalytic converter 72. Both lambda sensors 78, 80 output a sensor signal in the form of a voltage as a function of the oxygen fraction in the exhaust gas 62. The lambda sensors 78, 80 may have designs, as broadband lambda sensors or jump lambda sensors, that are different from one another. The voltage signal of broadband lambda sensors is essentially proportional to the lambda value of the exhaust gas over wide ranges, while the voltage signal of jump lambda sensors, which ranges only about a lambda value of 1±0.03, shows a strong dependency on the lambda value. For a gasoline engine 12 with a downstream three-way catalytic converter 72, the internal combustion engine 12 in most operating points is controlled with a stoichiometric combustion lambda of one, since at this value the three-way catalytic converter 72 has its optimal conversion power for the three exhaust gas components HC, CO, and $NO_x$. In this configuration the first lambda sensor 78 is often designed as a broadband lambda sensor, and the lambda sensor 80 is designed as a jump lambda sensor. The exhaust gas system 60 may include additional sensors not illustrated here, in particular a temperature sensor for detecting the exhaust gas temperature, the temperature of the catalytic converter 72, or the temperature of the particle filter 74.

The fuel vapor sorption system 100 has a sorption agent container 102 in which a sorption agent 104 for sorption of fuel vapors, i.e., hydrocarbons, is present. In the present case, sorption is understood to mean any reversible binding, for example absorption, physical adsorption (physisorption), and/or chemical adsorption (chemisorption). The sorption agent 104 is preferably activated carbon, in particular an activated carbon filter, that binds fuel vapors by physical adsorption. The sorption agent container 102 is connected to the fuel tank 22 via a fuel vapor line 106. A purge line 108 branches off from the sorption agent container 102 and is divided into a first partial purge line 110 and a second partial purge line 112. The first partial purge line 110 opens into the return flow line 52 via the suction side of the suction jet pump 54. Downstream from the throttle valve 50, the second partial purge line 112 opens into the intake line 42 or directly into the inlet 16 of the internal combustion engine 12. An actuating means for adjusting, in particular limiting, the volume flow in the purge line 108 is situated in the shared section of the purge line 108. In the present example the actuating means is designed as a valve that is controllable via an electric motor, and that is also referred to below as a tank vent valve 116. A blocking means 118, 120 that is designed to allow flow only in the direction of the return flow line 52, or the intake line 42 or the inlet 16, respectively, is situated in the partial purge lines 110, 112, respectively. If the downstream pressure at the blocking means 118, 120 is greater than the upstream pressure or is greater than a predetermined pressure, the blocking means 118, 120 automatically close. The fuel vapor sorption system 100 may also include a diagnostic module that is in fluid-conducting connection with the sorption agent container 102 via two lines. The diagnostic module has an overpressure valve that is connected to the surroundings, and a pump (neither of which is illustrated). The diagnostic module is used on the one hand for pressure compensation of the sorption agent container 102 and the fuel tank 22, and on the other hand for monitoring tank leaks. In addition, a purge blower 122 via which the hydrocarbons retained in the sorption agent container 102 may be conveyed into the purge line 108 may be provided at the sorption agent container 102. There are basically two options: Firstly, the purge air may be conveyed through the sorption agent container 102 by means of the purge blower 122. Alternatively, the purge blower 122 may be situated in the area of the first blocking means 118 and may draw the hydrocarbons out of the sorption agent container 102. The (additional) blocking means 118 may thereby be dispensed with. The suction jet pump 54 may be dispensed with when a purge blower 122 is used. The introduction of the uncombusted hydrocarbons from the sorption agent container 102 into the exhaust duct 64 likewise takes place upstream from the turbine 66 of the exhaust gas turbocharger 46.

The control device 90 controls, in a manner known per se, the operation of the internal combustion engine 12, in particular the supplied quantity of combustion air, via actuation of the throttle valve 50, and controls the supplied quantity of fuel via actuation of the fuel pump 30 and the fuel injection system 32. In addition, the control device 90 has a tank vent control module 92 that is configured to control the fuel vapor sorption system 100, and in particular to purge the sorption agent 104 with fresh air 44 from time to time in order to desorb the sorbed fuel vapors from the sorption agent 104, discharge them via the first partial purge line 110 or the second partial purge line 112, and supply them to the internal combustion engine 12.

The fuel vapor sorption system 100 of the vehicle 10 illustrated in FIG. 1 may be operated in a loading mode and at least one purge mode, and has the following functions:

In a loading mode the tank vent valve 116 is closed. Fuel vapors that evaporate from the fuel 24 in the tank 22 pass through the fuel vapor line 106 and into the sorption agent container 102, where they are adsorbed by the sorption agent 104 (activated carbon in this case). During this operation, the valve contained in the diagnostic module is continuously open in loading mode to allow pressure compensation between the fuel tank 22 or the sorption agent container 102 and the surroundings.

In the purge mode of the fuel vapor sorption system 100, which includes a fired purge mode and an unfired purge mode, the tank vent valve 116 is controlled in such a way that it is at least occasionally open, wherein a free flow cross section and/or opening intervals is/are set by a signal of the tank vent control module 92. The purge mode may on the one hand be activated as a function of loading, for example when a predetermined operating period in the sorption operating mode has elapsed, and thus, a predetermined loading limit of the sorption agent 104 is presumably achieved. Alternatively or additionally, the purge mode may be activated independently of the loading when the operating point of the vehicle is favorable.

The first, fired purge mode is used when the internal combustion engine 12 is "fired," i.e., operated with the supply and combustion of fuel. The combustion air is compressed via the compressor 48 and supplied to the internal combustion engine 12. A portion of the compressed air branches off from the air intake line 42 downstream from the compressor 48, and is supplied once again upstream from the compressor 48 via the return line 52. If a sufficiently high pressure of 1000 mbar, for example, i.e., a charged operating point, is present in the line 42 or the inlet 16, the valve 120 situated in the line 112 closes, and the first check valve 118, situated in the first partial purge line 110, opens. If the tank vent valve 116 is now opened, purge air is drawn in by means of the suction jet pump 53, through the purge lines 108 and 110 via the compressed air stream that is returned in the line 52, and mixed with the combustion air. The fresh air 44 necessary for this purpose flows from the surroundings, across the overpressure valve of the diagnostic module, and into the sorption agent container 102 and discharges desorbed fuel vapor. The purge air loaded with the fuel vapor is drawn in via the suction jet pump 54 according to the Venturi principle due to the pressure difference in the intake line 42 upstream and downstream from the compressor 48, and the combustion air is admixed and supplied to the internal combustion engine 12 via the intake line 42 and the inlet 16. The fuel vapor together with the fuel 24 supplied via the injection system 32 is combusted in the internal combustion engine. The exhaust gas 62 is discharged via the exhaust gas system 60 and subjected to catalytic aftertreatment.

The second, unfired purge mode is used in overrun phases of the vehicle, in which the motor vehicle 10 moves solely due to its excess kinetic energy, and the pistons and intake/exhaust valves of the internal combustion engine 12 are moved ("dragged") by the rotating crankshaft or camshaft. In overrun phases, for fuel consumption and emission reasons the fuel supply to the internal combustion engine 12 from the fuel tank 22 is interrupted, and in gasoline engines the ignition is generally suspended. An overrun phase is typically recognized based on the pedal travel sensor signal, for example when the driver lets up on the accelerator in order to decelerate the vehicle. In such an unfired overrun mode of the motor vehicle 10, a low pressure is present in the intake line 42 downstream from the compressor 48 and in the return line 52, so that the first check valve 118 is closed, and the second check valve 120 situated in the second partial purge line 112 is open. If the tank vent valve 116 is now opened, air is drawn in via the second partial purge line 112 by means of the dragged internal combustion engine 12, and in turn flows in from the surroundings, across the overpressure valve of the diagnostic module, and into the sorption agent container 102, and discharges fuel vapor that is desorbed from the sorption agent 104. The purge air thus loaded with fuel vapor flows from the container 102 and through the purge line 108 and the partial purge line 112, and is mixed with the combustion air of the internal combustion engine 12. Since the internal combustion engine 12 is not operated fired, there is no combustion of the hydrocarbons in the engine. Instead, they are catalytically reacted in the downstream exhaust gas catalytic converter 72.

During driving operation of the motor vehicle 10, the particles that arise during combustion of the fuel 24 in the combustion chambers 14 of the internal combustion engine 12 are retained by the particle filter 74 in the exhaust duct 64. Loading of the particle filter 74 is determined based on a differential pressure measurement, i.e., a comparison of the pressure in the exhaust duct 64 upstream from the particle filter 74 and downstream from the particle filter 74, or based on a balancing model stored in the control device 90. If the particle filter 74 has reached a loading level for which regeneration of the particle filter 74 is necessary to avoid a further rise in the exhaust back pressure due to exhaust back pressure that increases with the loading of the particle filter 74, in a regeneration phase the exhaust gas temperature $T_A$ or a temperature of the particle filter 74 is determined and compared to a first threshold temperature $T_{S1}$ necessary for regeneration of the particle filter. If the exhaust gas temperature $T_A$ and/or the temperature of the particle filter 74 are/is below this first threshold temperature $T_{S1}$, in an overrun phase of the internal combustion engine 12 the fuel vapors purged from the sorption agent container 102 are supplied to the internal combustion engine 12 and conveyed through the combustion chambers 14 and into the exhaust duct 64. An exothermic reaction of the fuel vapors on the three-way catalytic converter 72 occurs with the excess oxygen that is present In the exhaust duct 64 in an overrun mode. The particle filter 74 is heated to a regeneration temperature by the heat that is released during this exothermic reaction, as the result of which the soot particles retained in the particle filter 74 are oxidized with the oxygen that is present in the exhaust duct 64 in overrun mode, to form carbon dioxide.

As an alternative to conveying the fuel vapor from the sorption agent container 102 via a suction jet pump or a pressure gradient, at the sorption agent container 102 the fuel vapor that is retained in the sorption agent container 102 or in the sorption agent 104 may also be conveyed by the purge blower 122 into the intake line 42 or into the exhaust duct 64 of the internal combustion engine 12.

Figure 2:
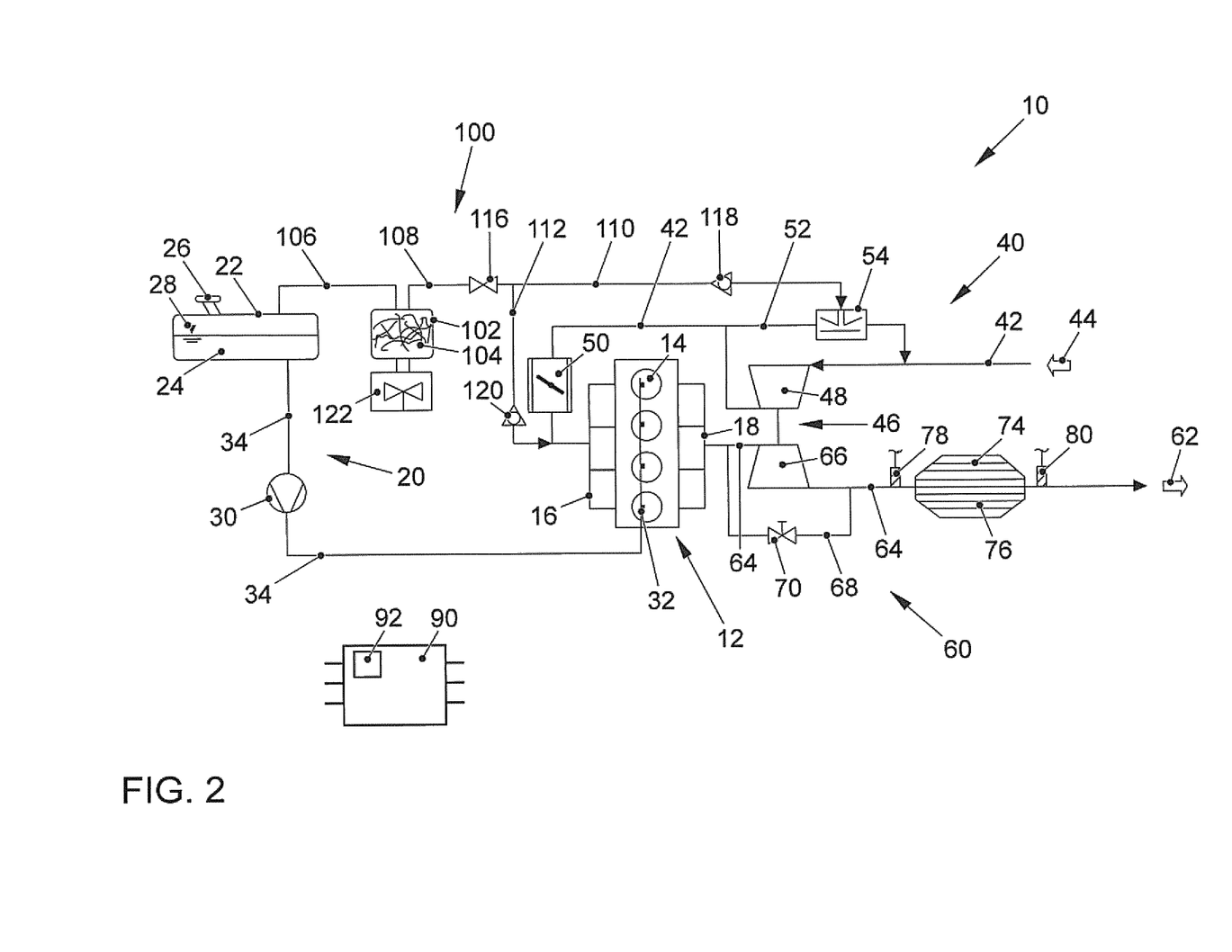
FIG. 2 shows an alternative exemplary embodiment of a block diagram of a motor vehicle according to the invention.

FIG. 2 illustrates one alternative exemplary embodiment of a motor vehicle 10 according to the invention. With essentially the same design and the same function as described for FIG. 1, instead of a three-way catalytic converter 72 and a particle filter 74, a four-way catalytic converter 76 is situated in the exhaust duct 64 of the internal combustion engine 12.

Figure 3:
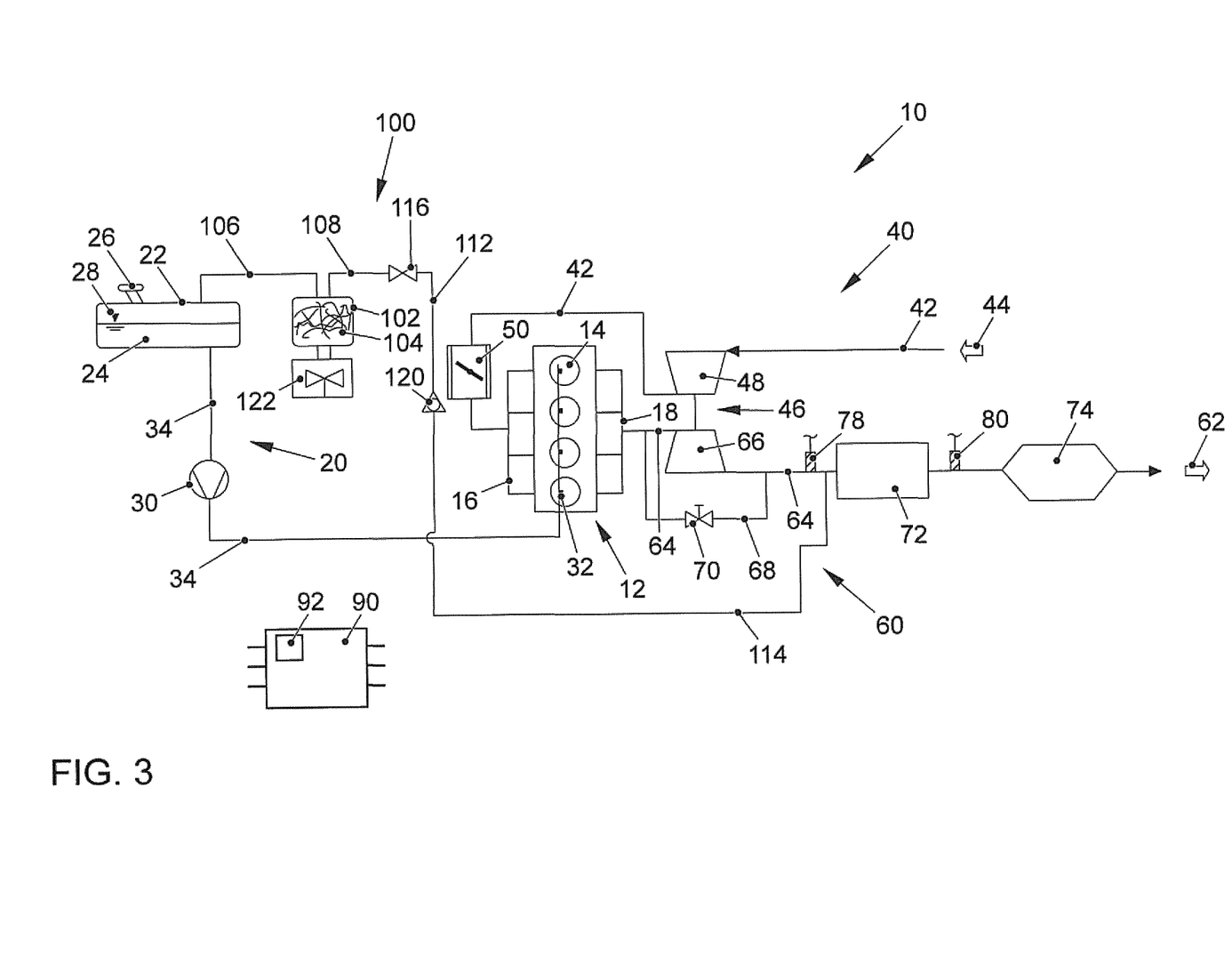
FIG. 3 shows another alternative exemplary embodiment of a motor vehicle according to the invention in a block diagram illustration.

FIG. 3 illustrates another alternative exemplary embodiment of a motor vehicle 10 according to the invention. With essentially the same design and the same function as described for FIG. 1, a third purge line 114 is provided that connects the sorption agent container 102 to the exhaust duct 64 upstream from the three-way catalytic converter 72.

LIST OF REFERENCE NUMERALS 10 motor vehicle
12 internal combustion engine
14 combustion chamber
16 inlet
18 outlet
20 fuel supply system
22 fuel tank
24 fuel
26 filling neck
28 filling level sensor
30 fuel pump
32 fuel injection system
34 fuel line
40 air supply system
42 intake line
44 fresh air
46 exhaust gas turbocharger
48 compressor
50 throttle valve
52 return flow line
54 suction jet pump
60 exhaust gas system
62 exhaust gas
64 exhaust duct
66 turbine
68 wastegate
70 wastegate valve
72 three-way catalytic converter
74 particle filter
76 four-way catalytic converter
78 first lambda sensor
80 second lambda sensor
90 control device
92 tank vent control module
100 fuel vapor sorption system
102 sorption agent container
104 sorption agent/activated carbon
106 fuel vapor line
108 purge line
110 first purge line
112 second purge line
114 third purge line
116 actuating means/tank vent valve
118 first check valve
120 second check valve
122 purge blower
$\lambda$ combustion air ratio/exhaust gas/air ratio
T temperature
$T_{S1}$ first (upper) threshold temperature
$T_{S2}$ second (lower) threshold temperature

The invention claimed is:

1. A method for regenerating a particle filter in an exhaust gas system of a motor vehicle, the motor vehicle having: an internal combustion engine that is operable with a fuel, an exhaust duct in which at least one catalytic converter and, downstream of the at least on catalytic converter, at least one particle filter is situated, a fuel tank, a sorption agent container that is in fluid-conducting connection with the fuel tank and contains a sorption agent, and a purge line that selectively connects the sorption agent container to the internal combustion engine or to the exhaust duct upstream from the particle filter, wherein, in order to heat the particle filter, supplying the fuel retained in the sorption agent container is supplied to the purge agent line, the method comprising:

in a first purging mode, supplying the fuel retained in the sorption agent container to the combustion engine and burning that retained fuel in the combustion chambers of the internal combustion engine, and in a second purging mode used in overrun phases of the vehicle, in which the motor vehicle moves solely due to its excess kinetic energy, catalytically reacting the fuel retained in the sorption agent container in the at least one catalytic converter.

2. The method according to claim 1, further comprising initiating engine-internal measures for increasing the exhaust gas temperature.

3. The method according to claim 1, further comprising determining a loading state of the particle filter, and carrying out a purging operation of the sorption agent container when the need for regenerating the particle filter is established.

4. The method according to claim 3, further comprising determining an exhaust gas temperature in the exhaust duct, and wherein the purging operation of the sorption agent container is carried out when the exhaust gas temperature is below a first threshold temperature.

5. The method according to claim 4, wherein the purging operation of the sorption agent container is carried out only when the exhaust gas temperature is above a second threshold temperature.

6. The method according to claim 1, further comprising generating an air stream used for purging the sorption agent container by means of a pumping or suction action of the internal combustion engine.

7. The method according to claim 1, further comprising supplying a volume flow of fuel to the exhaust duct by a purging operation of the sorption agent container and controlling or regulating the volume flow by setting a mass or volume flow of the air conveyed through the sorption agent container.

8. The method according to claim 1, further comprising supplying a mass or volume flow conveyed through the sorption agent container and setting the volume flow by an opening time and/or an opening cross section of an actuating means situated in the purge line.

9. A motor vehicle, including:
an internal combustion engine that is operable with a fuel,
an exhaust gas system in which at least one catalytic converter and, downstream of the at least on catalytic converter, at least a particle filter is situated,
a fuel tank,
a sorption agent container that is in fluid-conducting connection with the fuel tank and contains a sorption agent,
a purge line that connects the sorption agent container to the internal combustion engine and/or to the exhaust gas system upstream from the particle filter, and a control device that is configured for carrying out the method according to claim 1.

10. The motor vehicle according to claim 9, further comprising a three-way catalytic converter situated in the exhaust gas system, downstream from an outlet of the internal combustion engine and upstream from the particle filter.

11. The motor vehicle according to claim 9, further comprising a four-way catalytic converter having a particle filter with a three-way catalytically active coating situated in the exhaust gas system.

12. The motor vehicle according to claim 10, wherein the purge line opens into an exhaust duct of the exhaust gas system downstream from an outlet and upstream from the three-way catalytic converter.

13. The motor vehicle according to claim 9, wherein the sorption agent container is fluidically connected to a suction jet pump.

14. The motor vehicle according to claim 9, further comprising a purge blower for purging the sorption agent container situated at the sorption agent container.

15. The motor vehicle according to claim 11, wherein the purge line opens into an exhaust duct of the exhaust gas system downstream from an outlet and upstream from the four-way catalytic converter.

* * * * *